(12) United States Patent
Luik (10) Patent No.: US 8,740,509 B2
(45) Date of Patent: Jun. 3, 2014

(54) CUTTING INSERT FOR A CUTTING TOOL FOR MACHINING BY CHIP REMOVAL, IN PARTICULAR FOR HIGH FEED MILLING

(75) Inventor: Matthias Luik, Reutlingen (DE)

(73) Assignee: Hartmetall-Werkzeugfabrik Paul Horn GmbH, Tuebingen (CV)

( * ) Notice: Subject to any disclaimer, the term of this patent is extended or adjusted under 35 U.S.C. 154(b) by 100 days.

(21) Appl. No.: 13/357,340

(22) Filed: Jan. 24, 2012

(65) Prior Publication Data

US 2013/0028670 A1    Jan. 31, 2013

Related U.S. Application Data

(63) Continuation of application No. PCT/EP2010/058935, filed on Jun. 23, 2010.

(30) Foreign Application Priority Data

Jul. 24, 2009 (DE) .......................... 10 2009 035 754

(51) Int. Cl.
    *B23C 5/20* (2006.01)

(52) U.S. Cl.
    USPC .............................. 407/42; 407/61; 407/113

(58) Field of Classification Search
    CPC ............................................. B23C 2200/0483
    USPC ...................................... 407/42, 61, 62, 113
    See application file for complete search history.

(56) References Cited

U.S. PATENT DOCUMENTS

| | | | |
|---|---|---|---|
| 4,294,565 A * | 10/1981 | Erkfritz .......................... 407/113 |
| 4,618,296 A * | 10/1986 | Allaire et al. .................... 407/42 |
| 4,692,070 A * | 9/1987 | Shikata .......................... 407/104 |
| 4,898,500 A * | 2/1990 | Nakamura et al. ............... 407/62 |
| 4,927,303 A * | 5/1990 | Tsujimura et al. ............ 408/223 |
| 5,365,805 A | 11/1994 | Pantzar et al. |
| 5,421,679 A | 6/1995 | Pantzar et al. |
| 5,441,370 A | 8/1995 | Pantzar et al. |
| 5,762,453 A | 6/1998 | Arai et al. |
| 5,951,213 A | 9/1999 | Fauser et al. |
| 6,149,355 A | 11/2000 | Fouquer et al. |
| 7,040,844 B1 | 5/2006 | Daiguji |

(Continued)

FOREIGN PATENT DOCUMENTS

| | | |
|---|---|---|
| DE | 100 52 963 A1 | 5/2002 |
| DE | 10052963 A1 * | 5/2002 |
| EP | 0 504 608 B1 | 9/1992 |
| EP | 0 962 272 A1 | 12/1999 |

(Continued)

*Primary Examiner* — Daniel Howell
*Assistant Examiner* — Nicole N Ramos
(74) *Attorney, Agent, or Firm* — Saliwanchik, Lloyd & Eisenschenk (57) ABSTRACT

The present invention relates to a cutting insert for a cutting tool for the chip-removing high feed milling machining of workpieces, the cutting tool having a holder with a seat for receiving the cutting insert, the cutting insert having at least one cutting edge lying in a covering surface. To achieve a higher feed speed and greater cutting depth, particularly during high feed milling, there is provision, according to the invention, whereby the cutting edge has in portions three different radii of curvature, a first portion having the smallest radius, a middle second portion adjoining it having the largest radius, and a third portion adjoining the latter having a medium radius lying between the smallest and the largest radius, and whereby a peripheral line, running through all the cutting edges, of the covering surface is exclusively convexly curved. The invention relates, furthermore, to a correspondingly configured holder and to a cutting tool.

19 Claims, 4 Drawing Sheets

(56) References Cited

U.S. PATENT DOCUMENTS

| | | |
|---|---|---|
| 7,220,083 B2 * | 5/2007 | Festeau et al. ............ 407/113 |
| 8,096,735 B2 * | 1/2012 | Sladek et al. ............ 407/114 |
| 2003/0072625 A1 | 4/2003 | Morgulis et al. |
| 2004/0146365 A1 | 7/2004 | Usui et al. |
| 2005/0084342 A1 | 4/2005 | Festeau et al. |
| 2005/0152753 A1 | 7/2005 | DeRoche et al. |

FOREIGN PATENT DOCUMENTS

| | | | |
|---|---|---|---|
| JP | 59214501 A | * | 12/1984 |
| JP | 10138029 A | * | 5/1998 |
| JP | 10277815 A | * | 10/1998 |
| JP | 2000-190121 | | 7/2000 |
| JP | 2002263918 A | * | 9/2002 |
| JP | 2005-111651 | | 4/2005 |
| JP | 2007-516844 | | 6/2007 |

* cited by examiner

CUTTING INSERT FOR A CUTTING TOOL FOR MACHINING BY CHIP REMOVAL, IN PARTICULAR FOR HIGH FEED MILLING

CROSS REFERENCES TO RELATED APPLICATIONS

This application is a continuation of International Application No. PCT/EP2010/058935, filed Jun. 23, 2010, which claims priority to German patent application No. 10 2009 035 754.8, filed Jul. 24, 2009, the disclosures of which are all hereby incorporated herein by reference in their entirety, including all figures and tables.

BACKGROUND OF THE INVENTION

The present invention relates to a cutting insert for a cutting tool for the chip-removing high feed milling machining of workpieces, the cutting tool having a holder with a seat for receiving the cutting insert, the cutting insert having at least one cutting edge. The present invention relates, furthermore, to a holder for such a cutting tool with a seat for receiving a cutting insert and to a cutting tool with such a holder and with a cutting insert inserted into the seat of the holder, the cutting edge having in portions three different radii of curvature, a first portion having the smallest radius, a middle second portion adjoining it having the largest radius, and a third portion adjoining the latter having a medium radius lying between the smallest and the largest radius. The invention relates particularly to a cutting insert, to a holder and to a cutting tool for high feed milling.

A cutting insert for face milling is known, for example, from WO 2005/039811 A1. This cutting insert has a square configuration and has four cutting edges, at least one of the cutting edges being convexly curved. As a result, in particular, higher feed speeds, lower radial cutting forces and increased service lives are to be achievable.

SUMMARY OF THE INVENTION

The present invention is based on the object of providing a cutting insert and also a corresponding holder and a cutting tool, by the use of which, as compared with known cutting tools, greater cutting depths and higher feed speeds, even during penetration into a workpiece, can be achieved.

In a cutting insert initially mentioned, the object is achieved, according to the invention, in that a peripheral line, running through all the cutting edges, of the covering surface is exclusively convexly curved.

The invention is based on the recognition that, when the cutting insert is being used, greater cutting depths and higher feed speeds are achieved when the cutting edge of the cutting insert, said cutting edge being used for the chip-removing machining of workpieces, is not a straight or curved line with a single fixed radius, but instead has in portions different radii. The portion with the largest radius, which is used particularly during planar milling, on the one hand, brings about a good distribution of the forces, and, on the other hand, the forces act in the axial direction and can therefore be absorbed more effectively. The medium radius comes into effect particularly during penetration.

In the known cutting inserts, the feed speed has to be throttled when the cutting tool is used to penetrate into a workpiece obliquely. In planar milling, relatively little material above the cutting edge is located directly above the cutting edge on account of the large radius. The high feed speeds are therefore possible. In the case of oblique penetration, if an edge is straight and steep a relatively large amount of material is located above the cutting edge, even when feeds are low, and therefore the feed has to be reduced since otherwise the load becomes too high, whereas this is no longer necessary in the cutting insert according to the invention. In the cutting insert according to the invention, this is not so, since that portion of the cutting edge which is used during penetration, that is to say the portion with the medium radius, on the one hand, has a longer edge due to the radius and therefore distributes the forces more effectively, and, on the other hand, in the case of the low penetration angles here, because of the radius only a small amount of material is located perpendicularly to the cutting edge and has to be displaced.

A further advantage of the cutting insert according to the invention can be achieved when at least two cutting inserts arranged on a holder are used. Rotating such a cutting tool when it is used as a milling cutter thus gives rise to a sickle-shaped chip, and every third cutting edge portion comes into contact with the workpiece, until the cutting depth is reached, and then moves out of the workpiece. This arises from rotation.

Preferred refinements with regard to the size ratios of the portions and of the radii in relation to one another are given in subclaims. The actual implementation of the respective size ratios depends particularly on the desired use of the cutting insert. There is preferably provision for making the largest radius as large as possible. In an actual embodiment, for example, the largest radius is about four to five times larger than the medium radius which, for example, lies in the region of 5 mm. A cutting depth of about 1.2 mm, instead of 1 mm, as in known cutting tools, can thereby be achieved.

In a development, there is provision whereby the third portion has adjoining it a fourth portion which has a smaller radius than the third portion, in particular the same smallest radius as the first portion. Such a refinement is advantageous particularly in cutting inserts which have a triangular top side and on the sides of which three (identical) cutting edges are arranged. The in each case smallest radius is then the cutting corner radius at which two adjacent cutting edges of different triangle sides are contiguous to one another.

The cutting insert is preferably configured in the form of a cutting plate, the covering surface of which runs parallel to a bottom surface of the cutting insert. The cutting edges in this case run completely in the covering surface, with the result that the cutting insert can be produced more simply.

In a development of this, there is provision whereby the cutting insert has a plurality of, in particular three, cutting edges, and whereby in each case a side surface running obliquely to the bottom surface is provided between cutting edge and bottom surface. The obliquity is in this case preferably configured such that the side surface runs essentially at a side surface angle in the range from 50° to 90°, in particular in the range from 70° to 80°, to the bottom surface. In an actual embodiment, for example, a side surface angle of 75° is provided.

Preferably, furthermore, at least one bearing surface and one flank are provided on the side surface. The bearing surface is in this case preferably of planar configuration, is contiguous to the bottom surface and lies in the middle region of the side surface, preferably without being contiguous to the cutting edge contiguous to this side surface. This bearing surface serves for bearing against a matching supporting surface in the seat of the holder when the cutting plate is configured as an indexable cutting plate having a plurality of cutting edges. As a result, the cutting insert can be fixed in position in the holder securely and exactly.

Preferably, the side surface has a first flank contiguous to the cutting edge and a second second flank contiguous to the bottom surface, to the bearing surface and to the first flank. The advantage of this is that the cutting wedge formed from face and flank becomes more stable. If there is only one flank, this would have to be at a large clearance angle, since milling tools should not sit on the flank beyond a cutting circle diameter of 20 mm. Preferably, therefore, according to the invention the two flanks have clearance angles of different sizes, the clearance angle of the second flank preferably being slightly larger than the clearance angle of the first flank.

As regards the radius of curvature of the flanks, there is preferably provision, furthermore, whereby the first and second flanks have the same largest radius of curvature as the middle second portion of the associated cutting edge. This ensures that the cutting insert can run freely and can be produced with justifiable outlay.

A further aspect of the present invention relates to a corresponding holder for a cutting tool for the chip-removing machining of workpieces, with a seat for receiving a cutting insert, in particular a cutting insert according to the present invention. This holder is wherein the seat is oriented in the holder in such a way that the cutting edge effective for the chip-removing machining extends essentially from the outer circumference of the holder in the direction of the center of the holder and runs obliquely upward from the outer circumference in the direction of the center with respect to a cross-sectional plane running perpendicularly to the longitudinal axis of the holder.

In particular, there is provision, furthermore, whereby the seat is oriented in the holder in such a way that the point, projecting furthest, as seen in the longitudinal direction of the holder, of the cutting edge effective for the chip-removing machining lies between the center of the holder and the middle of this cutting edge. Furthermore, the seat preferably has two planar bearing surfaces running at a bearing angle, in particular of 120°. to one another, and the bearing surfaces are oriented in such a way that the bisecting line between the bearing surfaces runs at an angle of rotation in the range of between 1° and 20°. in particular in the range of between 3° and 10°. to the longitudinal axis of the holder. According to the invention, therefore, the holder is preferably configured such that, as compared with the customary positioning in the holder, the cutting plate is seated, slightly rotated, in the holder, thus contributing to the possibility of achieving a greater cutting depth or a higher removal of material, as compared with known tools of the same type.

Since, according to the invention, the cutting insert is seated, rotated, in the holder, and since the largest radius of the cutting edge effective for machining lies in the outer region of the cutting edge, as seen from the center of the holder, the vertex of the cutting edge is displaced somewhat inward toward the center of the holder, with the result that the greater cutting depths are achieved. The vertex is less relevant here, since, by being applied obliquely, the cutting corner is also displaced rearward in the axial direction in addition to the radius. Greater cutting depths are thereby possible. By the vertex being displaced in the direction of the center, a very large radius can be additionally applied (that is to say, the middle portion) to the main cutting edge, thus in turn having a positive effect on the load upon the tool. The larger the radius is, the lower the load is. If the selected radius is too large, the cutting depth will become smaller again, and therefore the cutting insert is also mounted, rotated, on the holder. The invention is explained in more detail below by means of drawings, with reference to exemplary embodiments which do not restrict the invention. In the drawings:

BRIEF DESCRIPTION OF THE DRAWINGS

FIG. 1 shows different views of a cutting insert according to the invention.

FIG. 2 shows different views of a holder according to the invention.

FIG. 3 shows different views of a cutting tool according to the invention, and FIG. 4 shows, as details, two views of the cutting tool according to the invention in use during two different types of machining.

DESCRIPTION OF PREFERRED EMBODIMENTS

Figure 1A:
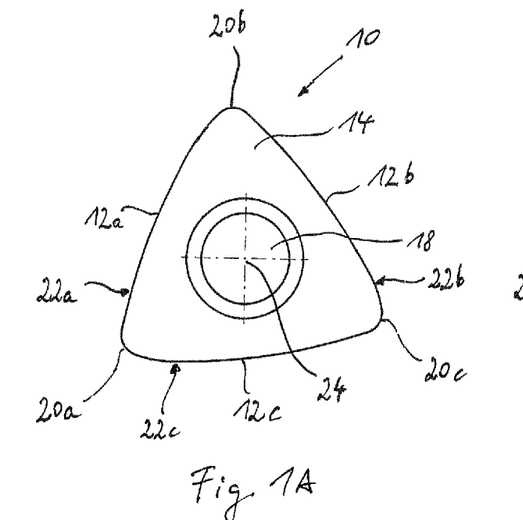
Figure 1B:
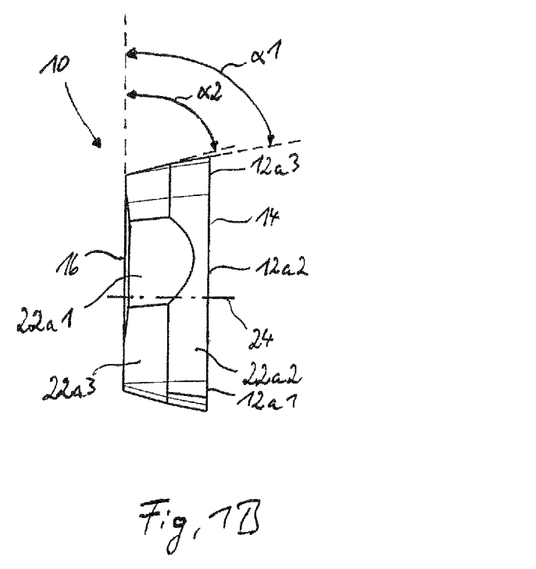
Figure 1C:
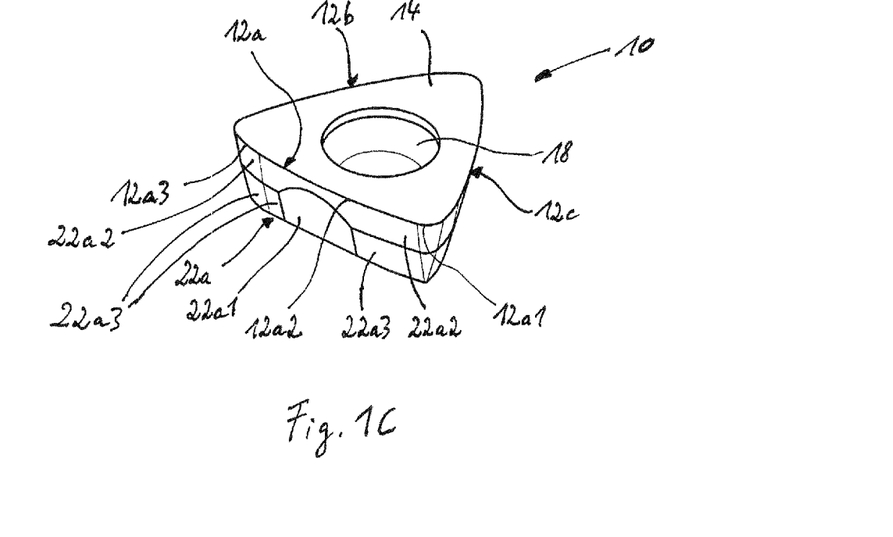

FIG. 1 shows an exemplary embodiment of a cutting insert 10 according to the invention, FIG. 1A showing a top view, FIG. 1B a side view and FIG. 1C a perspective view. In this exemplary embodiment, the cutting insert 10 is configured as an indexable cutting plate in the form of an equilateral triangle (as seen in top view) with three cutting edges 12*a*, 12*b*, 12*c*. The covering surface 14 and the bottom surface 16 are of planar configuration and are oriented parallel. Located at the center of the cutting insert 10 is a throughbore 18 having a cross section widening toward the covering surface 14, through which throughbore a clamping screw (not shown) can be led in order to fasten the cutting insert 10 to a holder, as will be shown in more detail below.

The cutting edges 12*a*, 12*b*, 12*c* run in each case over the entire length of the respective triangle side between the cutting corners 20*a*, 20*b*, 20*c* contiguous in each case, but have in each case in portions different radii of curvature. This will be explained in more detail with reference to the cutting edge 12*a*.

In a first portion 12*a*1, which commences directly at the cutting edge 20*a*, the radius of curvature is the smallest and amounts, for example, to 0.8 mm for such a triangular indexable cutting plate. This first portion 12*a*1 is the smallest portion of the cutting edge 12*a*. Contiguously to it lies the largest second portion 12*a*2 which has the largest radius of curvature. In an exemplary embodiment for a triangular indexable cutting plate 10 shown, this second radius of curvature lies, for example, at 22.6 mm. The third portion 12*a*3 contiguous to the second portion 12*a*2 has a medium length and a medium radius of curvature which lies in terms of size between the first and the second radius of curvature, for example at 5 mm for a cutting insert 10 shown. This has adjoining it the next cutting edge 12*b*, in particular its first portion having the smallest radius; this first portion of the cutting edge 12*b* therefore directly emanates tangentially from the third portion 12*a*3 of the first cutting edge. The further cutting edges 12*b* and 12*c* are constructed basically correspondingly like the cutting edge 12*a*; it is also conceivable, however, to configure the cutting edges differently for different applications.

The three side surfaces 22*a*, 22*b*, 22*c* that lie in between covering surface 14 and bottom surface 16 run obliquely, as seen with respect to a bore axis 24 running through the central bore 18, the bottom surface 16 overall being smaller than the covering surface 14. Each of the side surfaces 22*a*, 22*b*, 22*c* has in this case different subsurfaces, and this will be explained in more detail with reference to the side surface 22*a*.

A planar bearing surface 22*a*1 for bearing against a matching supporting surface in the seat of the holder is provided essentially contiguously to the bottom surface 16. Between this supporting surface 22*a*1 and the middle portion 12*a*2 of the cutting edge 12*a* lies a first curved flank 22*a*2 which follows the cutting edge profile and which runs essentially at a first flank angle α1 to the bottom surface 16. This first flank angle α1 amounts, for example, to 79°. A second flank 22*a*3 is provided laterally contiguously to the planar bearing surface 22*a*1, to the bottom surface 16 and to the first flank 22*a*2 and is likewise curved and follows the cutting edge profile of the cutting edge 12*a*. This second flank 22*a*3 likewise runs obliquely to the bottom surface 16 at a second flank angle α2 which is somewhat smaller than the first flank angle α1 and amounts, for example, to 75°. These flanks are therefore arranged circumferentially on all the side surfaces 22*a*, 22*b*, 22*c* and are in each case interrupted only by the bearing surfaces.

It will be appreciated that the indications of size mentioned for the various radii, angles and portions are merely exemplary indications which do not restrict the scope of protection. It is essential that the middle portion of the respective cutting edges is in each case the longest and has the largest radius of curvature, and that the first cutting edge portion is the shortest portion with the smallest radius of curvature. Preferably, the second portion 12*a*2 is larger than the third portion 12*a*3 by the factor 2 to 10, in particular 3 to 5, and the third portion 12*a*3 is preferably larger than the first portion 12*a*1 by the factor 2 to 10, in particular 2 to 5. Preferably, further, the largest radius of curvature of the second portion 12*a*2 is larger than the medium radius of the third portion 12*a*3 by the factor 2 to 10, in particular 3 to 5, and the medium radius of the third portion 12*a*3 is preferably larger than the smallest radius of the first portion 12*a*1 by the factor 2 to 15, in particular 5 to 10. The side surfaces 22*a*, 22*b*, 22*c* generally run at flank angles of 50° to 90°, in particular in the range of 70° to 80°, to the bottom surface 16.

Figure 2A:
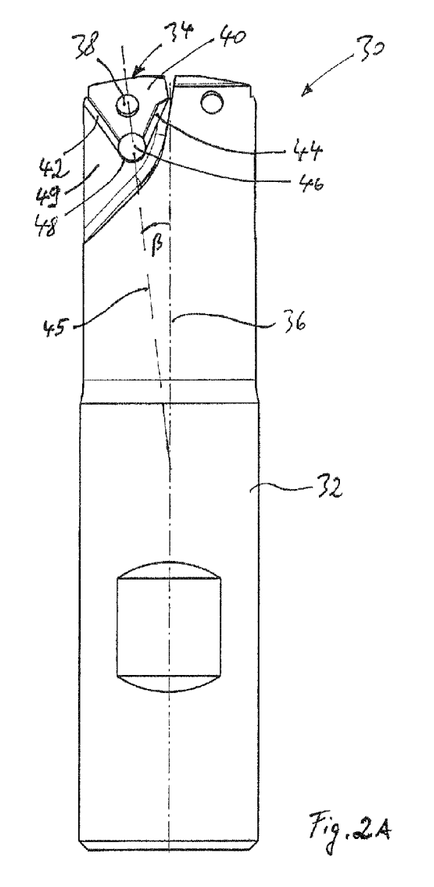
Figure 2B:
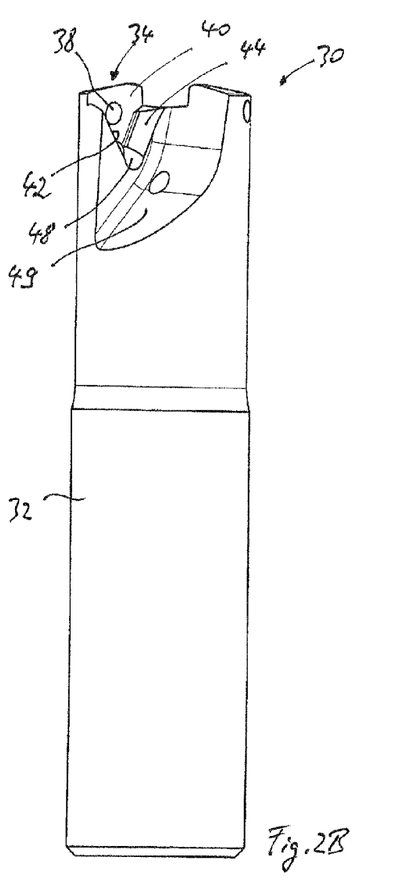
Figure 2C:
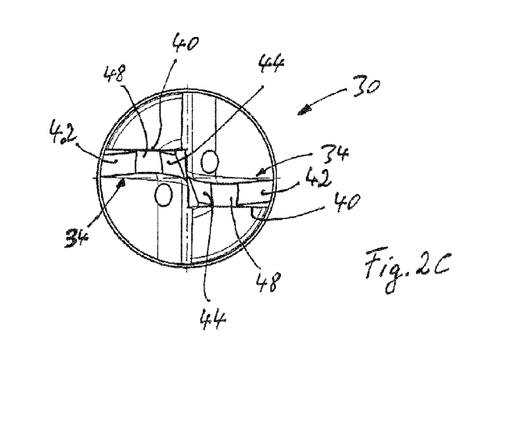

FIG. 2 shows an exemplary embodiment of a holder 30 according to the invention in various views, FIG. 2A showing a side view, FIG. 2B a perspective view and FIG. 2C a top view. In this exemplary embodiment, the holder 30 is adapted for receiving a cutting insert 10 shown in FIG. 1. For this purpose, two recesses 34, as a seat for receiving in each case a cutting insert 10, are provided on the end face at the workpiece-side end of the holder shank. These recesses 34 are arranged point-symmetrically to the longitudinal axis 36 of the holder 30, so that the two cutting inserts 10 are used alternately as a result of the rotation of the holder 30. To fasten the cutting insert 10 in the recess 34 by means of a clamping screw, in each case a threaded bore 38 is provided approximately centrally in the recess 34. With the cutting insert 10 being fastened in the recess 34, the bottom surface 16 of the cutting insert 10 is then pressed against the bottom supporting surface 40 which preferably likewise has a planar configuration.

Furthermore, the recess 34 is delimited by two side supporting surfaces 42, 44 which run in a V-shaped manner with respect to one another, are of planar configuration and run slightly obliquely with respect to the bottom supporting surface 40, so that the opening angle of the recess 34 therefore tapers toward the bottom supporting surface 40. These side supporting surfaces 42, 44 support the respective bearing surfaces of those side surfaces 22*b*, 22*c* of the cutting insert 10 of which the associated cutting edges 12*b*, 12*c* are not in use.

In the lower region of the recess 34, the bottom supporting surface 40 has a depression 46, and the side supporting surfaces 42, 44 merge into a widening 48 of semicircular configuration, so that the cutting insert 10 is not supported in this region.

The region of the holder 30 in front of the two recesses 34 is in each case cut free in the usual way in a large region 49.

Figure 3A:
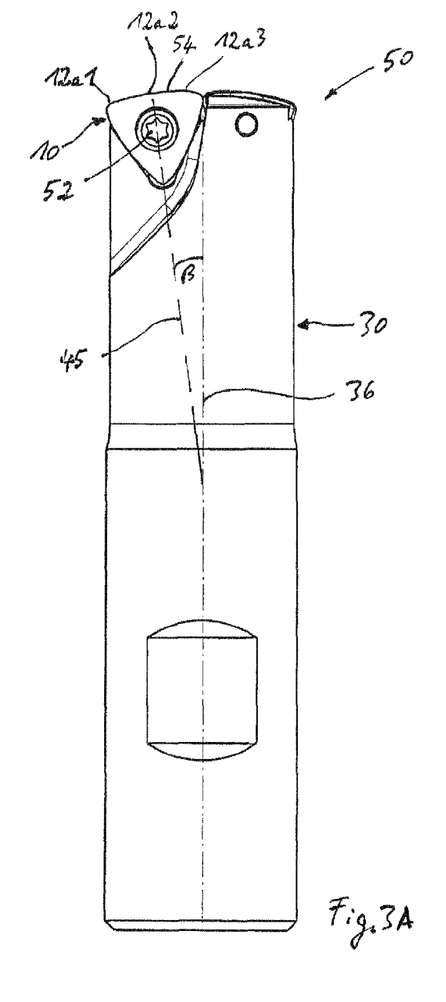
Figure 3B:
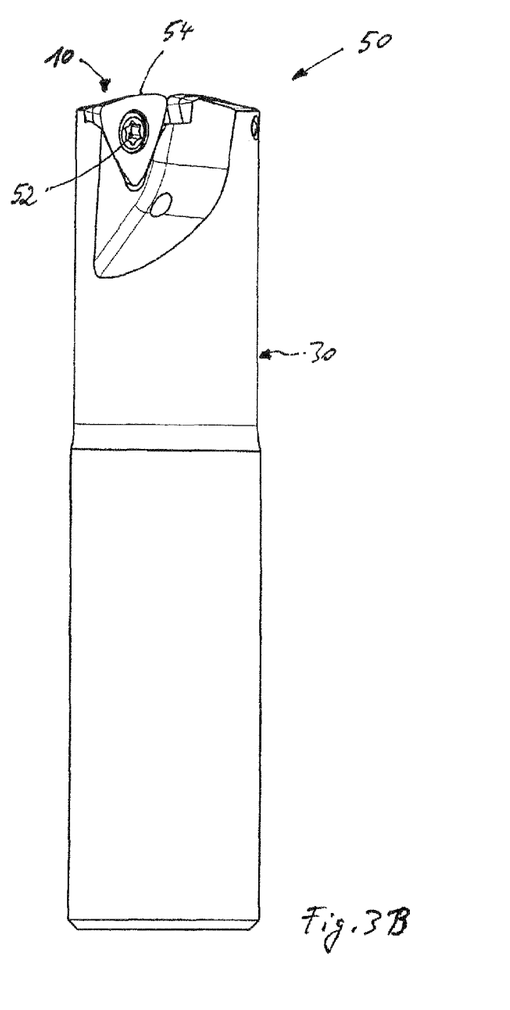
Figure 3C:
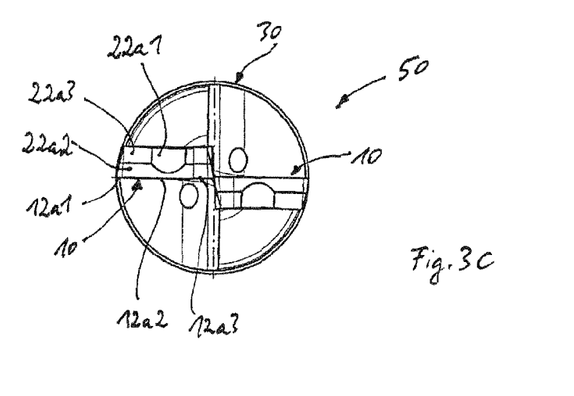

FIG. 3 shows an exemplary embodiment of a cutting tool 15 according to the invention, which is formed by a holder 30 shown in FIG. 2, by two of the cutting inserts 10 shown in FIG. 1 and by two clamping screws 52 for fastening the cutting inserts 10 to the holder 30. FIG. 3A in this case shows a side view, FIG. 3B shows a perspective view and FIG. 3C shows a top view. As can be seen particularly in FIG. 3C, the two cutting inserts 10 are arranged point-symmetrically to the longitudinal axis 36 of the holder 30. Furthermore, the cutting inserts 10 are arranged such that, as regards the cutting edge provided for the machining (let this be, for example, the cutting edge 12*a*), the first portion 12*a*1 with the smallest radius of curvature lies completely on the outside, the second portion 12*a*2 with the largest radius of curvature lies in the middle, and the medium-sized portion 12*a*3 with the radius of curvature of medium size lies completely on the inside, in each case with respect to the central longitudinal axis 36 of the holder 30.

Furthermore, the recesses 34 in the holder 30, in particular their side supporting surfaces 42, 44, are arranged in such a way that the cutting inserts 10 are arranged so that they are in each case slightly rotated with respect to the longitudinal axis 36 and as seen in the side view (FIG. 3A). In other words, the bisecting line 45 (see FIG. 2A) between the two side supporting surfaces 42, 44 does not run parallel to the longitudinal axis 36 of the holder, but instead obliquely thereto at a small angle of rotation β. In the exemplary embodiment shown, this angle of rotation μ is just 7°. generally the angle of rotation β lying in the range between 1° and 20°. in particular in the range between 3° and 10°. What is achieved thereby is that in each case the cutting edge in use (in the present case the cutting edge 12*a*), as seen from the side (FIG. 3A), runs from the outer circumference of the holder in the direction of the center of the holder obliquely upward as far as a vertex 54 which still lies in the region of the second cutting edge portion 12*a*2 and shortly before the commencement of the third cutting edge portion 12*a*3, that is to say in the region between the middle of the cutting edge 12*a* and the mid-center of the holder 30. The cutting edge 12*a* runs from there slightly obliquely downward in the direction of the center of the holder, As a result of this configuration of the cutting insert according to the invention and of the holder according to the invention and the arrangement of the cutting inserts which is thereby achieved in the corresponding recesses of the holder, the cutting tool 50 according to the invention can advantageously be used for high feed milling. Even in the case of oblique penetration into a workpiece, the feed speed does not have to be lowered markedly, in contrast to known tools for such machining, and even greater cutting depths can be achieved. This will be illustrated by the two views, shown as details in FIG. 4, of the cutting tool according to the invention in use during two different types of machining.

Figure 4A:
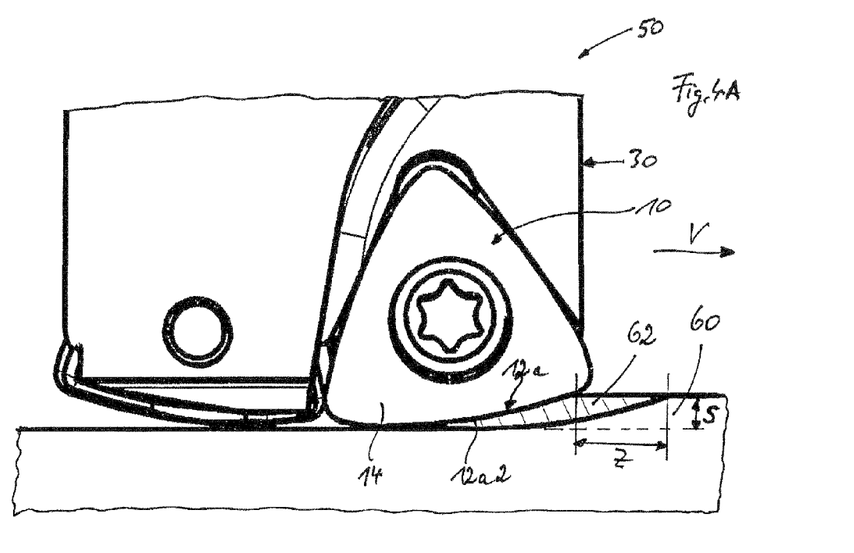

FIG. 4A shows a use of the cutting tool 50 according to the invention in face milling (planar milling) of a workpiece 60. In this case, a comma-shaped chip 62 is removed in the longitudinal direction, This is relatively large in the feed direction V (tooth feed Z). By contrast, the chip 62 is relatively small perpendicularly to the cutting edge 12*a* and to the covering surface 14 and therefore in the load direction. The larger the radius of that portion 12*a*2 of the cutting edge 12*a* which is used here, the thinner the removed material of the workpiece perpendicularly to the cutting edge 12*a* also is. In order nevertheless also to achieve a sufficient cutting depth S, the cutting plate 12 and therefore also the cutting edge 12*a* are mounted, rotated, in the holder 30. The vertex 54 thereby travels in the direction of the center of the holder 30. This gives rise here to the advantage of a very large active radius, thus leading to low load and a long service life, while at the same time a sufficiently large cutting depth is achieved due to the oblique setting.

Figure 4B:
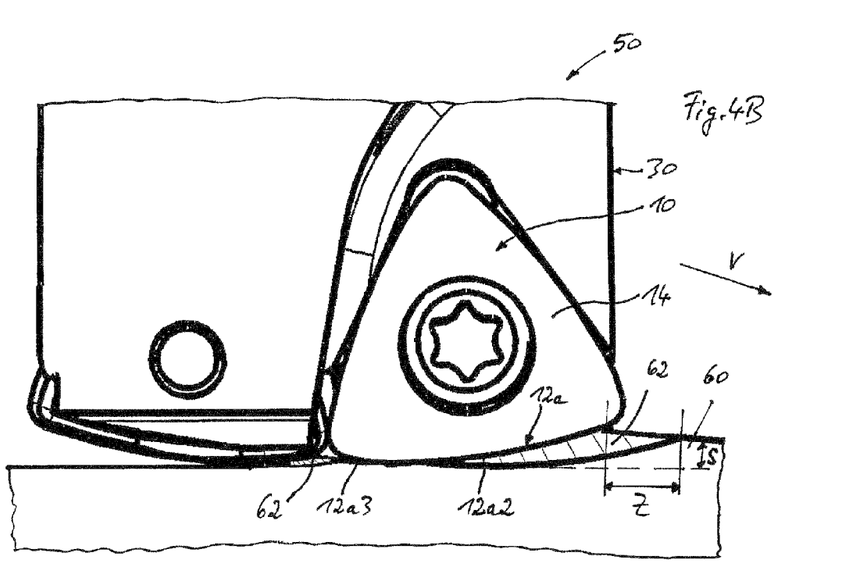

FIG. 4B shows a use of the cutting tool 50 according to the invention in the plunge milling or high feed milling (nonplanar milling) of a workpiece 60. Two comma-shaped small chips 62 are removed by the third portion 12a3 of the active cutting edge 12a upon oblique penetration into the workpiece 60. In the case of both cutting edge portions 12a2 and 12a3, a small amount of material is located above the cutting edge 12a perpendicularly to the latter. If the third portion 12a3 with the medium radius were not present, the cutting edge 12a would be subjected to a markedly higher load in this region than is the case with the cutting tool according to the invention. The tooth feed Z would therefore have to be reduced, since otherwise the service life of the cutting insert would be curtailed markedly on account of the higher load.

The invention is not restricted to the exemplary embodiments shown. Apart from different dimensions, a different number of cutting inserts can also be fastened to the holder, and the cutting inserts may likewise be configured differently. Configuration as an indexable cutting plate with three cutting edges is also not absolutely necessary. Also in each case only one cutting edge or two or more than three cutting edges may be provided. The main intended use of the cutting tool according to the invention is high feed milling. This is understood to mean milling with higher tooth feeds than usual. Normally, greater than approximately 0.5 mm/tooth.

A cutting tool according to the invention can preferably be used for rough machining. In this case, it is important to cut away as much material as possible in a short time, the surface in this case being of secondary importance. The milling cutters can in this case be used in a versatile way, such as, for example, for face milling, packet milling, hollowing out or plunge milling.

What is claimed is:

1. A cutting insert for a cutting tool for the chip-removing high feed milling machining of workpieces, the cutting tool having a holder with a seat for receiving the cutting insert, comprising three cutting edges lying in a covering surface, wherein the cutting insert has a form of an equilateral triangle with one of the three cutting edges on each side,
    wherein the three cutting edges each have a first edge portion having a first radius of curvature, a second edge portion adjoining the first portion having a second radius of curvature, and a third edge portion adjoining the second edge portion having a third radius of curvature between the first radius of curvature and the second radius of curvature, wherein the first radius of curvature is less than the second radius of curvature and less than the third radius of curvature,
    wherein a peripheral line, running through all three cutting edges, of the covering surface is exclusively convexly curved.

2. The cutting insert as claimed in claim 1,
    wherein the second edge portion is larger than the first edge portion and larger than the third edge portion, wherein the first edge portion is smaller than the third edge portion.

3. The cutting insert as claimed in claim 2,
    wherein the second edge portion is larger than the third edge portion by the factor 2 to 10.

4. The cutting insert as claimed in claim 2,
    wherein the third edge portion is larger than the first edge portion by the factor 2 to 10.

5. The cutting insert as claimed in claim 1,
    wherein the second radius of curvature is larger than the third radius of curvature by the factor 2 to 10.

6. The cutting insert as claimed in claim 1,
    wherein the third radius of curvature is larger than the first radius of curvature by the factor 2 to 15.

7. The cutting insert as claimed in claim 1,
    wherein the third edge portion has adjoining it a fourth edge portion which has a fourth radius of curvature, wherein the fourth radius of curvature is smaller than the third radius of curvature.

8. The cutting insert as claimed in claim 1,
    wherein the covering surface runs parallel to a bottom surface of the cutting insert.

9. The cutting insert as claimed in claim 8,
    wherein the three cutting edges each have a corresponding side surface running obliquely to the bottom surface between the corresponding cutting edge and the bottom surface.

10. The cutting insert as claimed in claim 9,
    wherein each side surface has a bearing surface, contiguous to the bottom surface and arranged in a middle region of the side surface, for bearing against a matching supporting surface in a seat of the holder.

11. The cutting insert as claimed in claim 10,
    wherein each side surface has a first flank contiguous to the cutting edge and a second flank contiguous to the bottom surface, contiguous to the bearing surface and contigious to the first flank.

12. The cutting insert as claimed in claim 11,
    wherein the first flank and second flank have a flank radius of curvature, wherein the flank radius of curvature is the same as the second radius of curvature of the second portion of the associated cutting edge.

13. The cutting insert as claimed in claim 8,
    wherein each side surface runs essentially at a side surface angle in the range from 50° to 90° to a plane in which the bottom surface lies.

14. A holder for a cutting tool for the chip-removing machining of workpieces, comprising:
    at least one seat for receiving a cutting insert, as claimed in claim 1, wherein each seal has two planar bearing surfaces running in a V-shaped manner with respect to each other,
    wherein each seat is oriented in the holder in such a way that the cutting edge effective for the chip-removing machining extends essentially from an outer circumference of the holder in a direction of a center of the holder and runs obliquely upward from the outer circumference in the direction of the center of the holder with respect to a cross-sectional plane running perpendicularly to a longitudinal axis of the holder.

15. The holder as claimed in claim 14, wherein the seat is oriented in the holder in such a way that a point, projecting furthest in a longitudinal direction of the holder, of the cutting edge effective for the chip-removing machining lies between the center of the holder and the middle of this cutting edge.

16. The holder as claimed in claim 14, wherein the seat has two planar bearing surfaces running at a bearing angle to one another, wherein the two planar bearing surfaces are oriented in such a way that a bisecting line between the two planar bearing surfaces runs at an angle in the range of between 1° and 20° with respect to the longitudinal axis of the holder.

17. A cutting tool, comprising:
    a holder as claimed in claim 14; and
    a cutting insert as claimed in claim 1.

18. The cutting tool according to claim 17, wherein the seat is oriented in the holder in such a way that a point, projecting furthest in a longitudinal direction of the holder, of the cutting edge effective for the chip-removing machining lies between the center of the holder and the middle of this cutting edge.

19. The cutting tool according to claim 17, wherein the seat has two planar bearing surfaces running at a bearing angle to one another, wherein the two planar bearing surfaces are oriented in such a way that a bisecting line between the two planar bearing surfaces runs at an angle in the range of between 1° and 20° with respect to the longitudinal axis of the holder.

\* \* \* \* \*

UNITED STATES PATENT AND TRADEMARK OFFICE
CERTIFICATE OF CORRECTION

PATENT NO.         : 8,740,509 B2
APPLICATION NO.    : 13/357340
DATED              : June 3, 2014
INVENTOR(S)        : Luik It is certified that error appears in the above-identified patent and that said Letters Patent is hereby corrected as shown below:

In the Specification

Column 2,
Line 53, "90°. in" should read --90°, in--.
Line 54, "80°. to" should read --80°, to--.

Column 3,
Line 37, "120°. to" should read --120°, to--.
Line 40, "20°. in" should read --20°, in--.
Line 41, "10°. to" should read --10°, to--.

Column 4,
Line 4, "invention." should read --invention,--.
Line 6, "invention." should read --invention,--.

Column 6,
Line 28, "rotation µ is just 7°. generally" should read --rotation β is just 7°, generally--.
Line 29, "20°. in" should read --20°, in--.
Line 41, "holder," should read --holder.--.
Line 57, "direction, This" should read --direction. This--.

Signed and Sealed this
Fourth Day of November, 2014

Michelle K. Lee
*Deputy Director of the United States Patent and Trademark Office*